United States Patent [19]
Paul

[11] Patent Number: 5,746,464
[45] Date of Patent: May 5, 1998

[54] SELF-LOCKING FRICTION BASED ROBOTIC GRIPPER

[75] Inventor: D. Scott Paul, Fort Collins, Colo.

[73] Assignee: Hewlett-Packard Company, Palo Alto, Calif.

[21] Appl. No.: 640,415

[22] Filed: Apr. 30, 1996

[51] Int. Cl.⁶ .................................................. B25J 15/08
[52] U.S. Cl. ........................... 294/116; 294/115; 901/39
[58] Field of Search .................................. 294/100, 106, 294/110.1, 115, 116; 414/739, 753, 932; 901/36–39; 623/64, 65

[56] References Cited

U.S. PATENT DOCUMENTS

| | | | |
|---|---|---|---|
| 3,370,213 | 2/1968 | Rose | 294/115 X |
| 4,667,998 | 5/1987 | Borcea et al. | 294/116 X |
| 4,918,548 | 4/1990 | O'Donnell et al. | 360/92 |
| 5,014,255 | 5/1991 | Wanger et al. | 369/36 |
| 5,043,962 | 8/1991 | Wanger et al. | 369/36 |
| 5,101,387 | 3/1992 | Wanger et al. | 369/36 |
| 5,234,244 | 8/1993 | Kim | 294/115 X |
| 5,363,258 | 11/1994 | Coles et al. | 360/92 |
| 5,456,528 | 10/1995 | Daizel | 312/9.46 |
| 5,487,579 | 1/1996 | Woodruff | 294/115 |

FOREIGN PATENT DOCUMENTS

| | | | |
|---|---|---|---|
| 3759 | 1/1979 | Japan | 294/115 |
| 624867 | 9/1978 | U.S.S.R. | 294/116 |
| 848354 | 7/1981 | U.S.S.R. | 294/115 |
| 1437340 | 11/1988 | U.S.S.R. | 294/116 |

*Primary Examiner*—Johnny D. Cherry
*Attorney, Agent, or Firm*—Augustus W. Winfield

[57] ABSTRACT

A robotic gripper with two fingers for friction gripping. The fingers are self-locking in that an increased resistance to a pulling force results in an increased gripping force. The fingers are mounted onto a thumb that slides in a sleeve. A post extends into slots in the fingers so that movement of the post relative to the thumb causes the fingers to rotate around pivot points on the thumb. The friction force required to move the thumb relative to the sleeve is greater than the friction force required to move the post relative to the thumb. Therefore, movement of the post typically results in rotation of the fingers and a stationary thumb, but there are several ways in which the post can be locked relative to the thumb to provide movement of the thumb relative to the sleeve. The sleeve also includes features so that if an object is being gripped as the post is moving away from the sleeve, the fingers do not grip when the post is retracted. If no object is being gripped as the post is moving away from the sleeve, the fingers rotate to a gripping position as the post is retracted.

3 Claims, 6 Drawing Sheets

SELF-LOCKING FRICTION BASED ROBOTIC GRIPPER

FIELD OF INVENTION

This invention relates generally to robotic gripping mechanisms, with particular application to a robotic gripper mechanism for data cartridges for computer information storage libraries.

BACKGROUND OF THE INVENTION

Automated materials handling systems automatically retrieve (also called pick) and place objects and transport the objects between locations. In general, the systems must have a way of holding the objects. In some systems, the objects to be moved are uniformly sized so that the objects may be gripped by specialized mechanisms. One specific example application is a computer information storage library (also known as an autochanger). A computer information storage library typically includes at least one information storage drive mechanism, a media storage system for computer information media or data cartridges, a gripper (or picker, or manipulator or engagement mechanism) for inserting media or cartridges into drives or storage locations and for extracting media or cartridges from drives or storage locations, and a transport mechanism for moving the gripper and media or cartridges between drives and storage. Computer information storage drives with removable media include, for example, disk drives (magnetic and optical) and magnetic tape drives. Media storage systems include, for example, carousels, cylindrical silos, and slotted magazines or racks. There is a wide spectrum of transport assemblies. For example, cartridges may be translated and rotated with four or more degrees of freedom by an anthropomorphic robot arm or cartridges may simply be translated in two dimensions. Alternatively, instead of a separate transport mechanism, the media storage system may be moveable. For example, a carousel may rotate to position a cartridge at a stationary drive. Alternatively, a drive may be moved by a transport system to a stationary cartridge location. There is also a wide spectrum of grippers and pickers. For example, friction grippers with multiple fingers may be used, various media or cartridge features may be hooked by pickers or clamped by grippers, or cartridges may be simply pushed or pulled.

Typically, data cartridges designed for robotic manipulation have catch surfaces, notches or other features on the cartridge shell to facilitate gripping or hooking. Typically, the gripping features are located symmetrically about a central axis to prevent twisting (and possibly binding) during extraction. However, some data cartridges were originally designed for manual manipulation, with no particular features intended for robotic gripping. For these types of cartridges, a friction gripper, dependent only on opposing flat surfaces may be appropriate.

In general, for any robotic gripper, it is desirable to reduce complexity, weight and number of parts. In particular, it is desirable to reduce the number of electrically active devices (such as sensing devices and motors) on moving system components, to eliminate potential sources for malfunction and to eliminate problems associated with moving electrical connections. There is a need for a gripper with a reduced number of electrical components.

Friction grippers typically use springs, motors or solenoids to develop the clamping force of the fingers in the cartridge. These methods typically provide a constant gripping force. They cannot develop additional gripping force to overcome a binding or friction condition. There is a need for a friction gripper capable of increasing its gripping force when necessary.

SUMMARY OF THE INVENTION

A robotic gripper includes a sleeve for transporting cartridges, a thumb, two fingers, and a nut driven by a lead screw. The two fingers provide friction gripping of two sides of an object. The thumb slides in guides in the sleeve. The fingers rotate around pivot points, mounted on the thumb. The fingers have levers extending beyond the pivot points, and slots in the levers. A post on the lead screw nut extends into the slots in the levers on the fingers. The nut and post can move relative to the thumb. If the post moves relative to the thumb, the post rotates the fingers without translating the thumb. The post and thumb are locked together for translation if the post reaches the ends of the slots, or if the fingers are gripping an object so that they can no longer rotate, or if a sliding plate on the thumb locks the post and the thumb together. The object may be grabbed and pulled into the sleeve for transport. Alternatively, the object may be pushed out of the sleeve and the fingers and thumb may then be retracted without gripping.

A motor is required for rotation of the lead screw (and subsequent translation of the lead screw nut relative to the sleeve), but no separate motors or solenoids are required to actuate the fingers or to provide a clamping force for gripping. As the force required to extract an object changes, the clamping force of the fingers (and the corresponding friction force on the object) changes proportionally. This self-locking action enables the gripper to work with coefficients of friction as low as 0.1 at the clamp surfaces, without slipping off the object being gripped. The gripper does not require notches or other specific features on the object to be gripped, only opposing flat surfaces. The pivots for the fingers are free to float in the transverse axis when the gripper is being retracted into the sleeve. This keeps the friction pads flat on the object being extracted, regardless of side to side misalignment of the object.

During retraction, the fingers can be in one of two states: a splayed state for releasing the object or a gripping state for gripping the object. The thumb includes a sliding plate with a pin. The state of the fingers is controlled by the pin traveling in one of two tracks in the sleeve. Choice of tracks is handled by a spring loaded gate that blocks one track at a junction, depending on whether a cartridge is present or not when the gripper is moving away from the sleeve. When the pin is in an inner track, the sliding plate locks the thumb to the post during retraction, keeping the fingers in a splayed state.

When the thumb is pushing an object, or when the gripper is approaching an object to be gripped, the fingers are splayed. This enables the gripper to get the object at any translation position (except when the pin is in the inner track), and simplifies error recovery if insertion cannot be completed. When the gripper is moving outward from the sleeve, the thumb self centers.

DETAILED DESCRIPTION OF THE PREFERRED EMBODIMENT OF THE INVENTION

Figure 1:
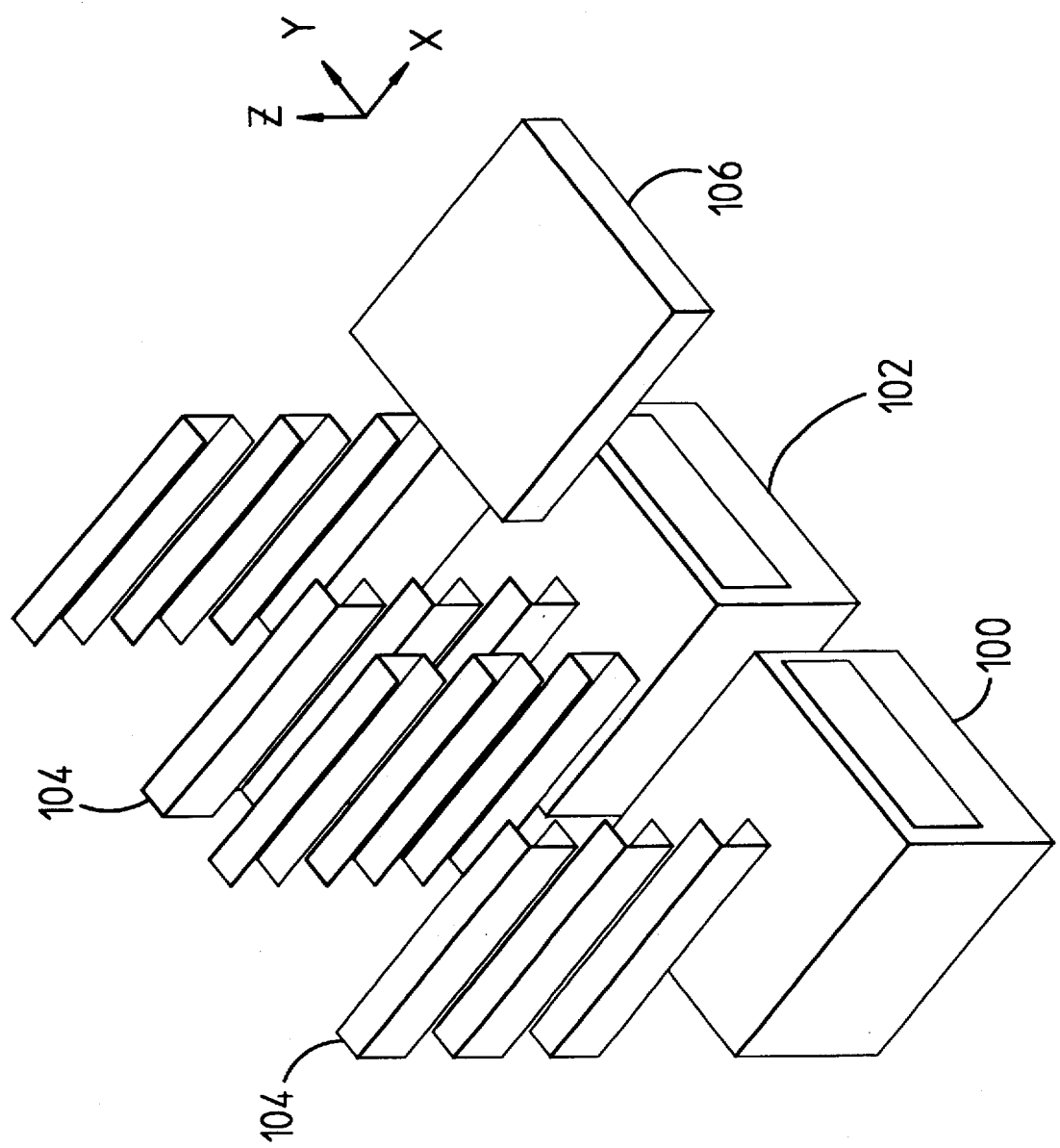
FIG. 1 is a simplified perspective view of portions of a computer information storage library.

FIG. 1 is a simplified illustration of a computer information storage library, an example of an application in which the gripper of the invention can be used. However, the gripper may be used in many other robotic gripping applications. The library illustrated in FIG. 1 has two information storage drive mechanisms, 100 and 102, mounted in the base of a cabinet (not illustrated). At least one column of cartridge storage locations 104 above the drives is used to store data cartridges. A compact example embodiment of a library using the picker of the invention may have only one column of storage locations and a larger embodiment may have three or more columns. The storage locations 104 may be defined, for example, by "C" shaped brackets as illustrated, "L" shaped brackets, edge guides, or other suitable holders. Preferably, the storage locations 104 include features to prevent cartridges from vibrating or shaking out of the storage locations. A transport mechanism (not illustrated) provides horizontal (Y) and vertical (Z) displacement of a gripper 106 and supports the gripper 106 at a fixed orientation relative to the displacement path. The gripper 106 includes a moveable thumb (not illustrated in FIG. 1) for displacement in the horizontal X direction. The gripper 106 also includes a sleeve for carrying a data cartridge (not illustrated in FIG. 1). Two fingers (not illustrated in FIG. 1), attached to the moveable thumb, insert a cartridge into a drive or storage location or extract a cartridge from a drive or storage location. Examples of suitable transport mechanisms for an information storage library configured as generally depicted in FIG. 1 may be found in U.S. Pat. Nos. 5,101,387, 5,043,962 and 5,544,146.

Figure 2:
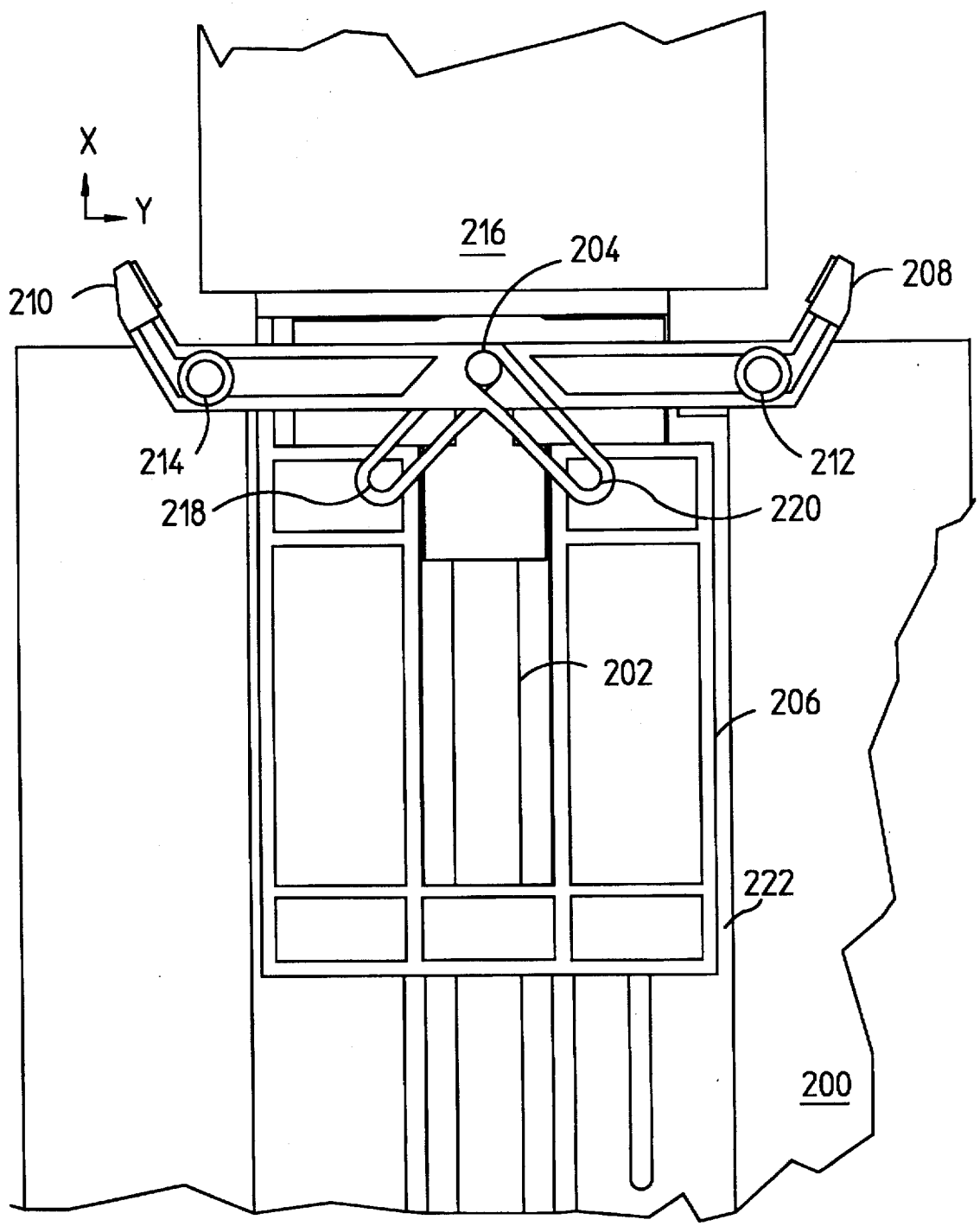
FIG. 2 is a top view of a sleeve, a moveable thumb, and two fingers on the moveable thumb, with the fingers in a splayed state.

FIG. 2 illustrates a sleeve 200 and an object 216 that is to be gripped and pulled into the sleeve 200 for transport. A motor (not visible in FIG. 2) drives a lead screw 202 which drives a follower nut (not visible in FIG. 2) to which a post 204 is attached. The motor for the lead screw is not illustrated, but a suitable arrangement may be seen in U.S. Pat. No. 5,014,255 (Wanger et al). Rotation of the lead screw 202 causes translation of the post 204 in the X dimension. A thumb 206 is also moveable in the X dimension, sliding within guides in the sleeve 200. A pair of fingers (208, 210) pivot around pivots 212 and 214 respectively. Each finger (208, 210) has a lever arm that extends beyond its pivot, with slots (218, 220) in the lever arms. The post 204 extends through the slots (218, 220) in the lever arms for the fingers (208, 210). The pivots (212, 214) (and therefore the fingers) are attached to the thumb 206. The thumb 206 and sleeve 200 are designed to provide a specified amount of friction when the thumb 206 slides on the sleeve 200. As a result, when the post 204 is translated in the X-dimension, the thumb 206 is not translated unless the post 204 hits either end of the slots (218, 220) or unless the fingers (208, 210) grip the object 216, locking the position of the slots (218, 220), or unless a sliding plate locks the thumb 206 to the post 204 (discussed below in conjunction with FIG. 4). When the post 204 is being translated and the thumb is stationary, the fingers (208, 210) are rotated around their respective pivots (212, 214), causing a gripping motion or splaying motion of the fingers (208, 210).

Figure 3:
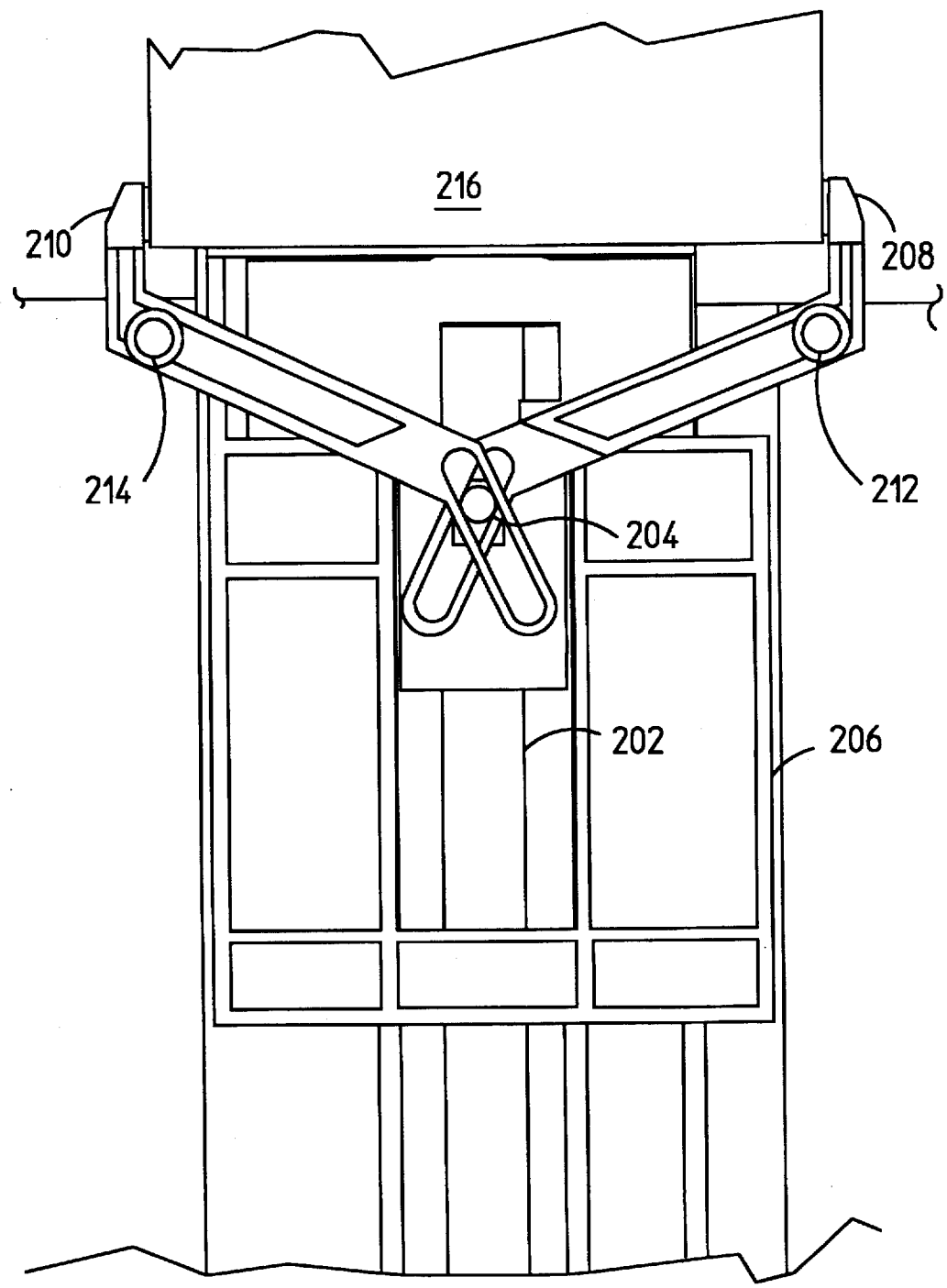
FIG. 3 is top view of the sleeve, thumb and fingers of FIG. 2 with the fingers in a gripping state.

In FIG. 3, the thumb 206 is in the same position as in FIG. 2, but the post 204 has been translated into the sleeve a sufficient distance to cause the fingers (208, 210) to rotate inward, causing the fingers to grip the object 216. If the post 204 is translated further into the sleeve, the object 216 prevents further inward rotation of the fingers (208, 210), locking the position of the slots (218, 220), causing the post 204 to pull the fingers 208, 210 the object 216 and the thumb 206 into the sleeve 200.

Note that for each finger (208, 210), a pulling force on the post 204 results in a rotational force on the finger, forcing the finger to rotate inward around its pivot (212, 214), which in turn makes the finger grip tighter. Therefore, increased pulling force on the post 204 results in increased normal gripping force on the object 216. As a result, the gripper is relatively insensitive to contaminants or other things affecting the coefficient of friction between the gripper, providing a grip on the object 216 with increasing force and without slipping off, even when the coefficient of friction at the clamp surfaces is as low as 0.1. Therefore, even if the object 216 binds or sticks, or even if the surface of object 216 is contaminated, the gripper will grip with increasing force until it is able to free the object 216. The surfaces on the tips of the fingers are flexible, preferably molded from an open cell polyurethane plastic (for example, BumpOn, available from 3M). Note also that for each finger (208, 210), the pivot (212, 214) is essentially aligned with the grip point, so that the gripping force is essentially normal to the object 216. Finally, the pivots (212, 214) are free to float in the transverse axis (Y dimension) when the gripper is being retracted into the sleeve. This keeps the friction pads flat on the object being extracted, regardless of side to side misalignment of the object.

Note in FIG. 2 that the fingers (208, 210) are splayed outward. To retrieve the object 216, as discussed in conjunction with FIG. 3, as the post 204 is pulled into the sleeve 200, the fingers (208, 210) first rotate inward, and then after the object 216 is gripped, the fingers (208, 210) are locked to the thumb 206. Alternatively, the object 216 may be pushed out of the sleeve into a storage location, so that the gripper needs to retract away from the object 216 with the fingers splayed as in FIG. 2. The gripper is designed so that if the gripper is pushed out of the sleeve 200 empty, the fingers are permitted to rotate when the gripper is pulled back into the sleeve. However, if the object 216 is present as the gripper is pushed out, during subsequent retraction the post 204 is locked to the thumb 206 with the fingers in a splayed position until the gripper has retracted a distance sufficient to ensure that the tips of the fingers have cleared the object 216. Control of this two-state arrangement is illustrated in FIGS. 4–6.

Figure 4:
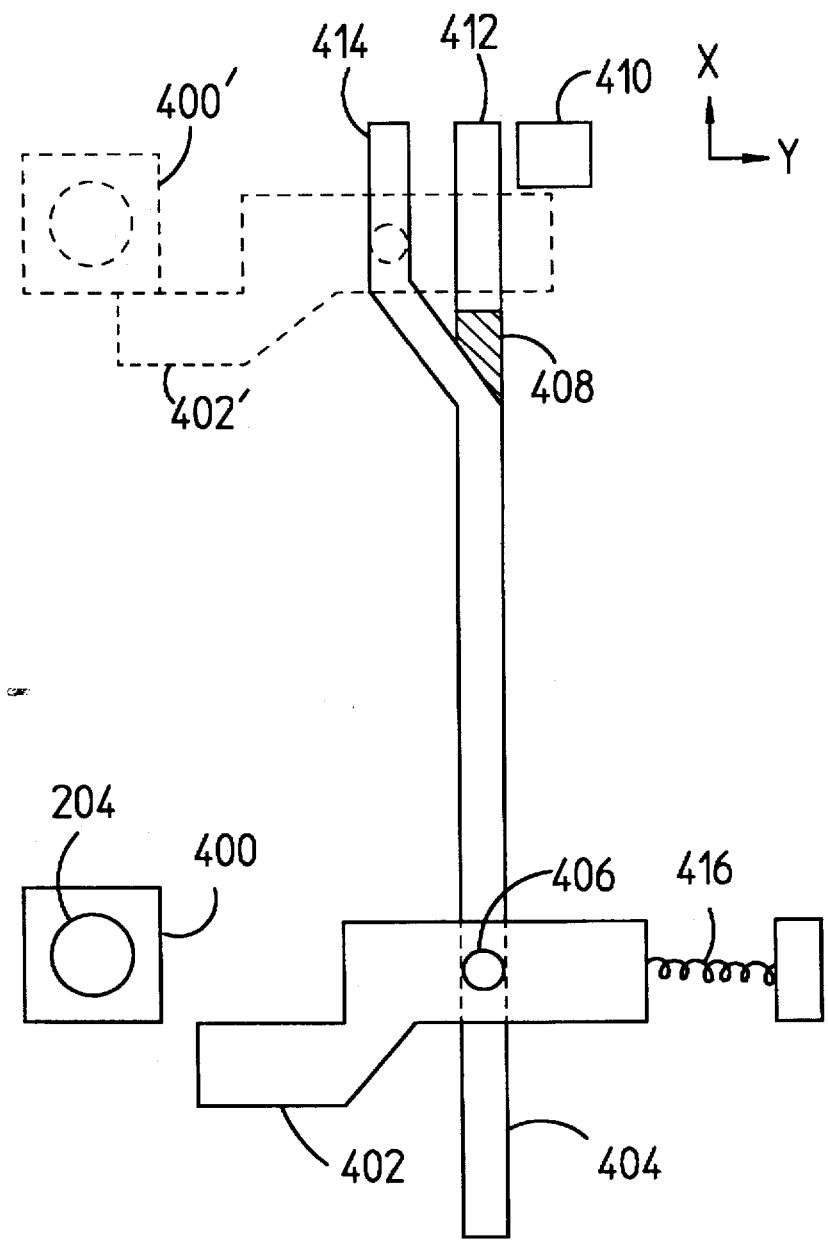
FIG. 4 is a top view of the sleeve illustrating tracks in the sleeve and a plate on the thumb used to lock the post to the thumb.

FIG. 4 is a top view of various parts of the sleeve and gripper illustrating the mechanism for determining the state of the fingers as the gripper is pulled into the sleeve. As illustrated in FIG. 4, the post 204 sits in a rectangular base 400. A plate 402, slides in the Y-dimension in guides on the thumb (FIG. 2, 206). The sleeve (FIG. 2, 200) includes a track 404. A pin 406 on the sliding plate 402 extends into the track 404. Near the end of the sleeve, the track 404 splits into two branch tracks, an outer track 412 and an inner track 414. A gate 408 is at the junction of the branches. The gate 408 is attached below the sleeve to a ramp 410. The gate 408 and the ramp 410 are spring loaded, so that normally the ramp 410 extends above the surface of the sleeve and the gate 408 is below (does not block) the track 404 and the outer track 412. If the ramp 410 is pressed down to be flush with the surface of the sleeve, the gate 408 is raised to block branch 412. If the gripper is empty as it is being pushed out of the sleeve, the gate 408 is recessed and the spring 416 on the plate 402 causes the pin 406 to travel into the outer track 412. If the gripper is pushed out of the sleeve with object 216, object 216 forces the ramp 410 down, raising the gate 408, forcing the pin 406 to travel into the inner track 414. When the pin 406 is in the inner track 414, the plate 402 blocks the return path of the base 400 (as depicted by base 400' and plate 402' in FIG. 4). When the gripper is pushing the object 216 out of the sleeve 200, the fingers are splayed as illustrated in FIG. 2. If plate 402' blocks base 400' as illustrated in FIG. 4, then when the gripper is pulled back into the sleeve, the base 400' first contacts the plate 402' and pulls the thumb back into the sleeve with the fingers still splayed. As the pin 406 approaches the junction of the branches, the plate 402' is pulled away from the base 400' and the fingers are then pulled inward. The tracks (404, 412, 414) for state switching and the one-way gate 408 leverage a concept from Wanger et al. However, the design of Wanger et al does not use tracks in conjunction with a sliding plate to lock the thumb to the nut.

Figure 5:
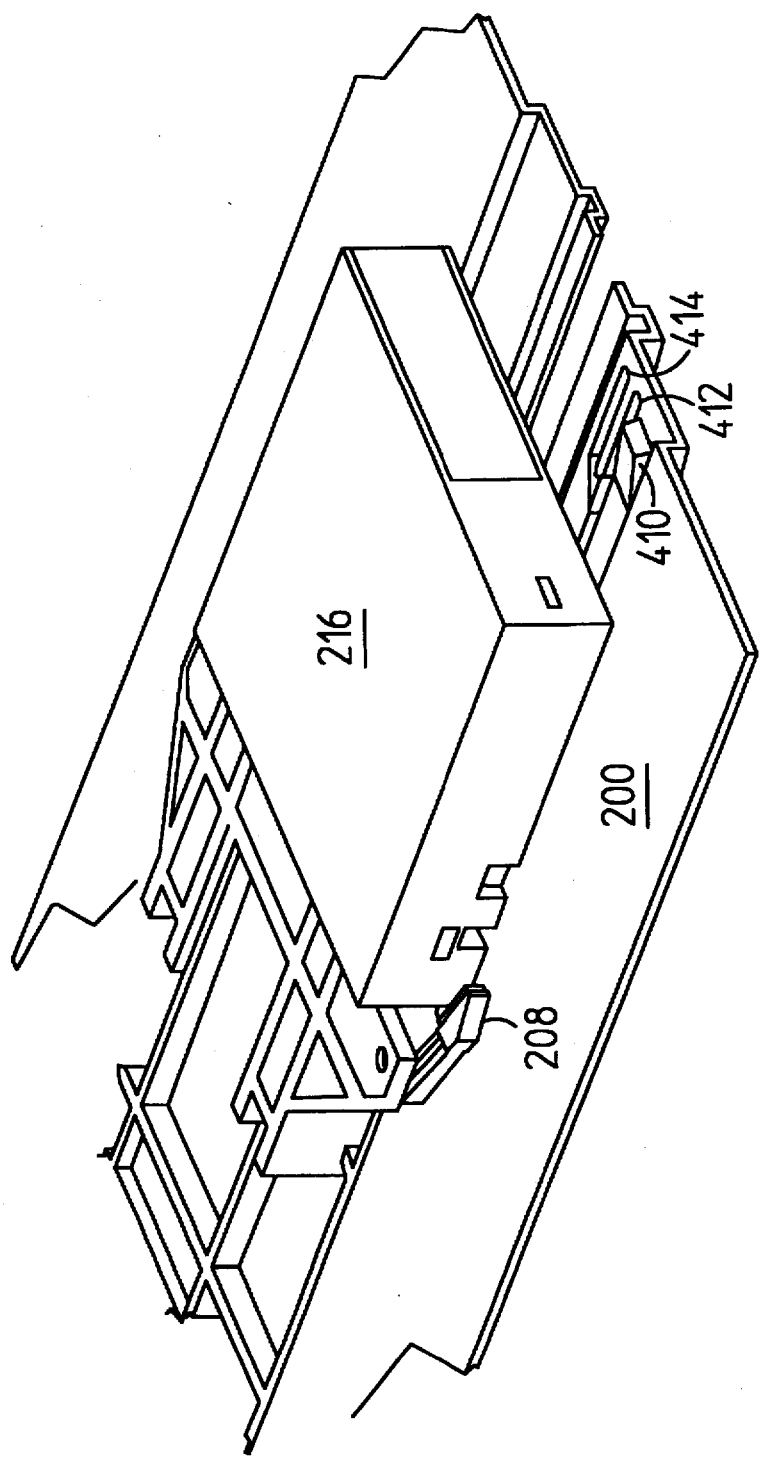
FIG. 5 is a perspective top view of the sleeve illustrating the tracks in the sleeve and a ramp used to control a gate at a track junction.

FIG. 5 is a top perspective view illustrating the carriage 200 with the branch tracks 412 and 414 and the ramp 410 in a raised position. FIG. 6 is a bottom perspective view illustrating the track 404 with branches 412 and 414, the gate 408 and the ramp 410.

Figure 6:
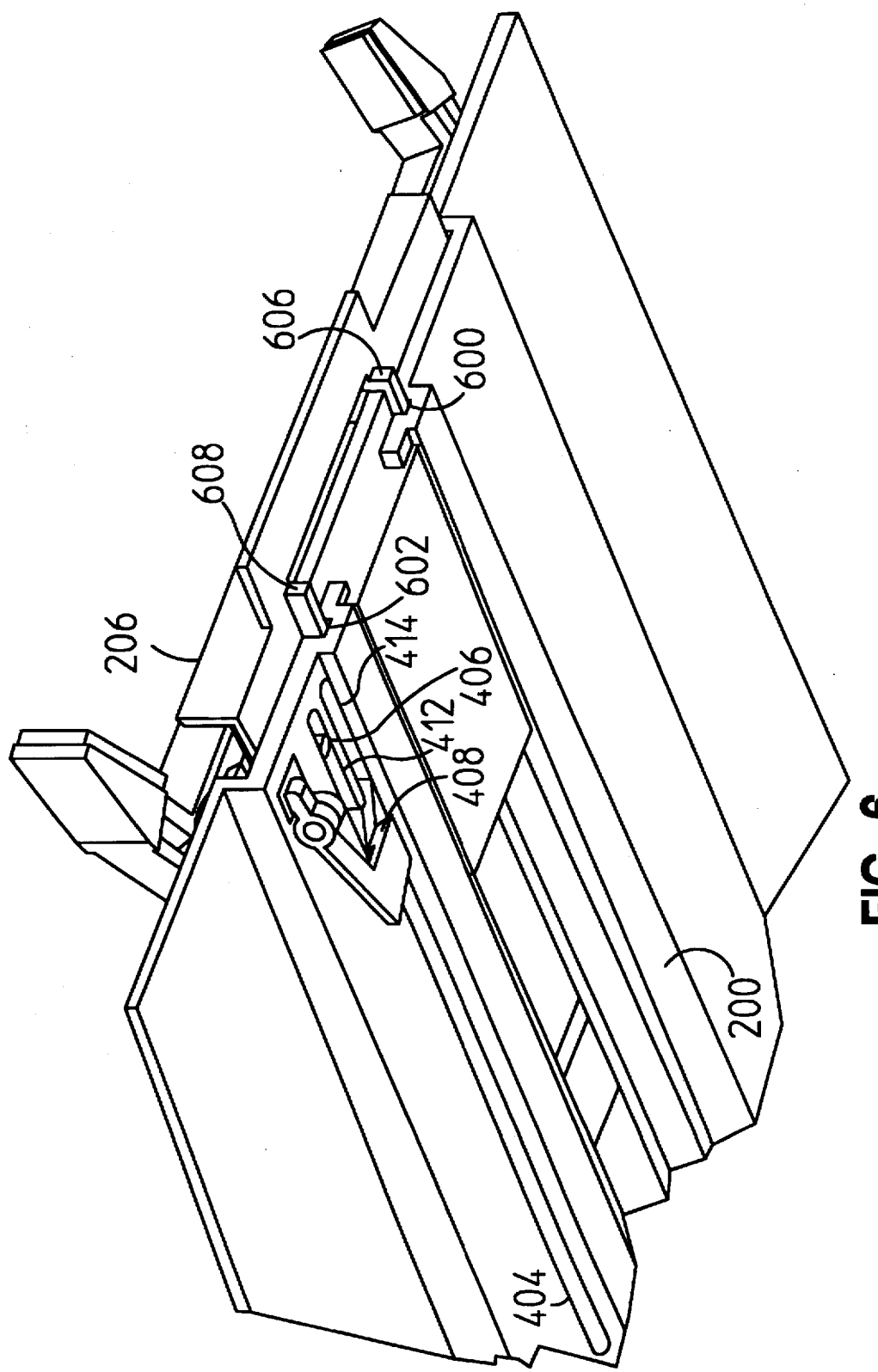
FIG. 6 is a perspective bottom view of the sleeve illustrating the tracks in the sleeve and the linkage between the gate and the ramp.

FIG. 6 also illustrates slots 600 and 602 molded into the sleeve 200 with corresponding ribs 606 and 608 on the bottom of the thumb 206. These surfaces must provide enough friction to ensure that the force required to move the thumb 206 relative to the sleeve 200 is greater than the force required to close and splay the fingers. Preferably, however, the surfaces should not wear, to ensure a long life and to ensure that no debris is generated due to rubbing. Instead the friction force is obtained by providing a consistent normal force on relatively low friction surfaces. For example, the thumb 206 may be molded from a nylon material with a Teflon filler. The sleeve may be molded from a polycarbonate material, also with a Teflon filler. The Teflon fillers help to provide a surface condition that reduces wear and debris and provides a consistent (but relatively low) friction over time. Referring back to FIG. 2, a flat steel spring may optionally be placed between the sleeve and the thumb, for example in the area indicated by reference number 222, to provide a consistent force on the thumb in the Y dimension. This provides a normal force in the Y dimension sufficient to ensure that the force required to move the thumb 206 relative to the sleeve 200 is greater than the force required to close and splay the fingers.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A robotic gripper comprising:

a sleeve;

a thumb adapted to slide in the sleeve;

pivot points on the thumb;

a post that is moveable relative to the thumb;

a pair of fingers for gripping an object, the fingers rotating around the pivot points on the thumb, the post extending into slots in the fingers, wherein movement of the post relative to the thumb causes the fingers to rotate:

movement of the post relative to the thumb requiring a first force having a first force magnitude;

movement of the thumb relative to the sleeve requiring a second force having a second force magnitude; and the second force magnitude being greater than the first force magnitude.

2. The gripper of claim 1 further comprising:

a first track in the sleeve;

a second track in the sleeve, the first and second tracks connected at a junction;

a plate moveably attached to the thumb;

a pin attached to the plate, the pin extending into one of the first and second tracks;

the plate locking the post and thumb together during retraction of the post into the sleeve when the pin is in the first track;

the plate permitting movement of the post relative to the thumb when the pin is in the second track.

3. The gripper of claim 2 further comprising:

a gate at the junction of the first and second tracks;

a ramp in the sleeve, the ramp connected to the gate;

wherein when the object is being gripped by the pair of fingers, the object forces the ramp into the sleeve, causing the gate to block the second track; and when the object is not being gripped by the pair of fingers, the gate does not block the second track.

\* \* \* \* \*